April 28, 1936. S. C. FULTON ET AL 2,038,558
MANUFACTURE OF SYNTHETIC RESINS OF PETROLEUM ORIGIN
Filed Oct. 30, 1931
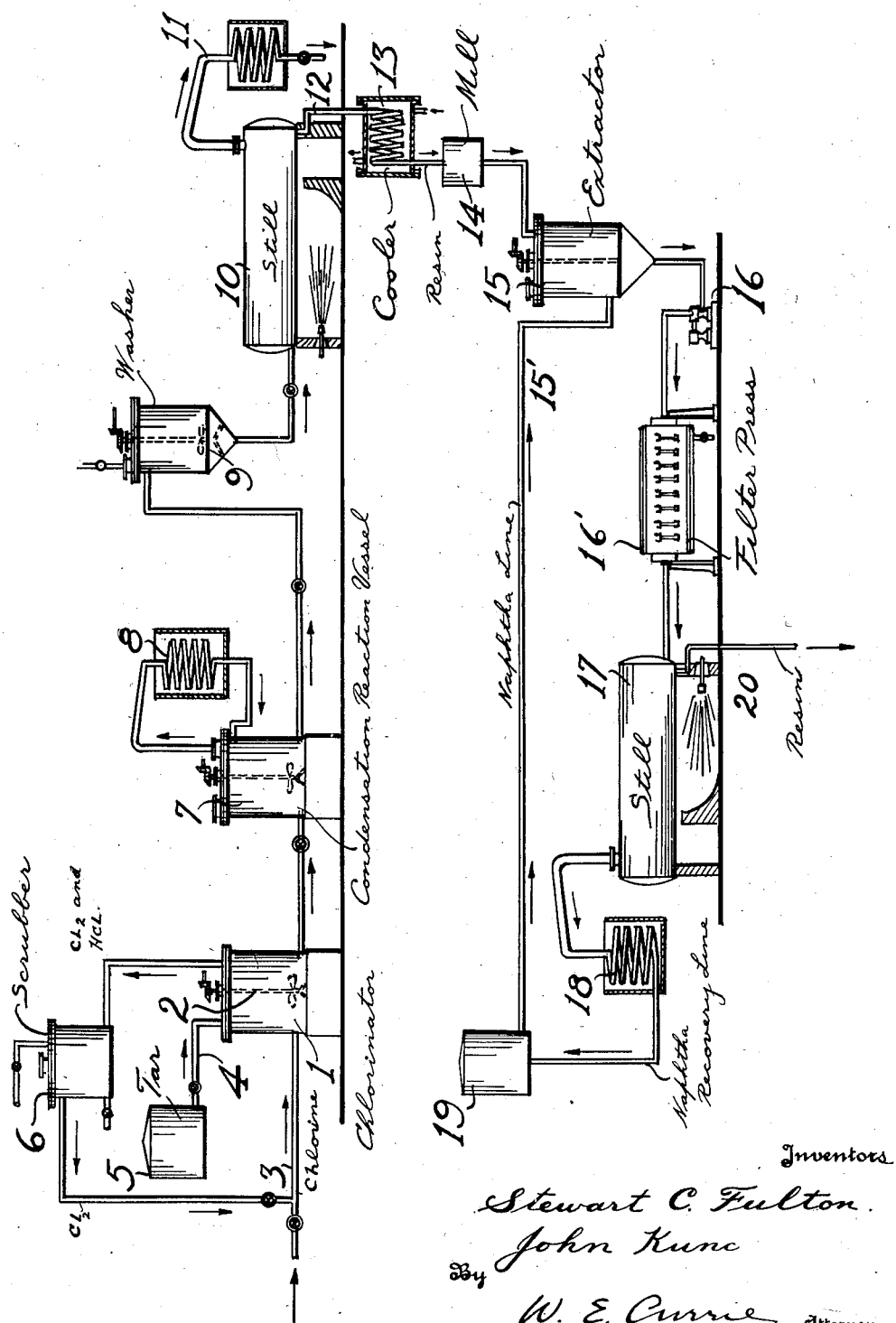
Inventors
Stewart C. Fulton
John Kunc
By W. E. Currie Attorney

UNITED STATES PATENT OFFICE 2,038,558

MANUFACTURE OF SYNTHETIC RESINS OF PETROLEUM ORIGIN

Stewart C. Fulton, Elizabeth, and John Kunc, Roselle Park, N. J., assignors to Standard Oil Development Company, a corporation of Delaware Application October 30, 1931, Serial No. 572,060

19 Claims. (Cl. 260—2)

This invention relates to the production of synthetic resins by means of chlorination and following condensation in the presence of aluminum chloride, and is an improvement on the process disclosed in the co-pending application of Stewart C. Fulton, Serial No. 572,058 filed on October 30, 1931 now Patent No. 1,981,824. The present invention will be fully understood from the following description when read in conjunction with the drawing, the sole figure of which is a semi-diagrammatic side elevation, partly in section, of a suitable form of apparatus.

Cracked tar of petroleum origin obtained in liquid or vapor phase cracking, or any similar process involving cracking is preferred as the raw material for the production of resins although other materials may be used, as subsequently described. The tar, which may have a gravity of, say 10°–11° A. P. I., is first subjected to distillation, preferably under vacuum, to remove the oily components overhead. If a high vacuum, for example 1 mm. mercury, is used, the oily components will distill over between the approximate temperatures of 300° to 660° F. However, it is not necessary to use such an extreme vacuum, but less vacuum with or without steam or other distillation aid may also be used and the distillation may even be carried out under atmospheric pressure using steam as carrier. Usually about 85% of the tar is obtained as overhead distillate.

The latter is then chlorinated by bubbling chlorine through it slowly. The temperature at which the chlorination is carried out may be ordinary room temperature or it may be somewhat higher, say up to 150° F., depending on the viscosity of the distillate. The product to be chlorinated is preferably agitated while the chlorine is bubbled through it. The chlorination is continued until 10 to 15% of chlorine is absorbed, although it may be interrupted earlier or may be carried farther. The amount of chlorine absorbed may be determined by any of the known analytical methods, or it may be roughly estimated by the increase of weight of the product.

The chlorinated product is agitated with or without heating in the presence of anhydrous aluminum chloride or other condensing agents such as zinc chloride, ferric chloride, etc. The amount of condensing agent is about 2–10% of the chlorinated product and the agitation is carried out at moderate temperatures, say up to 150° F. and in no case much above 210° F. The agitation is continued for ten hours or longer. Hydrochloric acid is liberated and the treated products undergo drastic changes in which condensation plays an important role. After condensation the total reaction product including sludge and oil is treated with water or weak acid or alkali. After separating the aqueous layer the oily products, together with further amounts of hydrochloric acid are removed by distillation, which may be carried out first under atmospheric pressure, then under vacuum, up to 660° F. under an absolute pressure of 1 mm. mercury.

In a modification of the present process an amount of say 20% of an aromatic hydrocarbon such as benzol, naphthalene, anthracene, phenanthrene, coal tar distillates, etc., or a naphthene such as hexahydrobenzol or a hydrogenated polycyclic aromatic hydrocarbon such as tetra hydro-naphthalene decahydro-naphthalene, etc., is added to the chlorinated product simultaneously with the aluminum chloride or other condensing agent. In general benzol is the most satisfactory aromatic hydrocarbon because it plays a dual role of reagent and solvent permitting the condensation to be carried out at the lower temperatures (room temperature) which favors the formation of petroleum hydrocarbon soluble products. After the condensation step the oily products are removed by distillation, as described above, after hydrolyzing with water or weak acid or alkali.

The bottoms of the distillation is cooled down to say 200° F. and agitated with about three times its weight of selective resin solvent such as light petroleum hydrocarbon distillate (naphtha). Instead of agitation the bottoms may be refluxed with the naphtha at the boiling point of the naphtha. The volatile petroleum hydrocarbon solvent, known in the commerce as "Varsol", may be used for this purpose. This has the following specifications:

| | |
|---|---|
| Color | +22 |
| Per cent off at 350° F | 55% minimum |
| Per cent off at 392° F | 95% minimum |
| Final boiling point | 410° F. |
| Abel flash | 100° F. |

Passes doctor test.

Although the solvent described is preferred, it will be understood that the present invention is in no way limited thereto.

The bottoms may also be completely dissolved in a small amount of a solvent such as ethylene dichloride, benzol, and a light paraffinic hydrocarbon such as petroleum ether, pentane, or butane added to the solution, whereby dissolved materials other than resins are precipitated.

The solution containing the resin is separated from the hydrocarbon insoluble material by means of settling and decantation or by filtration, or any other separating method known in the art. The naphtha is then removed from the dissolved resin by distillation under atmospheric pressure or under moderate vacuum, leaving as distillation residue the final resin product. For some purposes the naphtha solution of the resin may be used.

It is often desirable to treat the light naphtha solution with concentrated sulfuric acid before the final distillation step. The concentration of the acid may be 95% or it may be more, or less; fuming acid may also be used. The amount of acid varies within wide limits, say from 10% to 50% of the resinous material dissolved in the solvent. The more acid is used the lighter will be the color of the final resin. The acid sludge is separated and the solution is neutralized either by contacting with fine clay or by washing with water or dilute alkali. The acid treated and neutralized solution is distilled to separate it into the solvent and the resin.

The yield of resin is usually within the limits of 20%–50% of the tar distillate. The yield is somewhat higher than that obtained in the process described in the co-pending application above referred to and the softening point of the resin is also higher. The product has a softening point higher than 80° F. and usually from 190° F. to 250° F. as determined by the ball and ring method. The best yield of high softening point resin is obtained when benzol, naphthalene or other aromatic hydrocarbon is added simultaneously with the aluminum chloride. The resins obtained by this process are unsaponifiable, odorless and tasteless and have a yellow to reddish-brown color. The color is lighter (yellow) when acid treating is employed. In the latter case the resin is transparent in thin plates of, say ½ centimeter thickness. It is soluble in petroleum naphtha, linseed oil, China-wood oil, esters, and benzol, and insoluble in water, lower alcohols and acetone.

The tar is often advantageously distilled in two steps. The first 60% is discarded and used as heating oil, and only the last 40% is used as starting material for the production of resins. Instead of the tar distillate other hydrocarbon materials, such as for example a sulfur dioxide extract of a petroleum distillate or a petroleum distillate from asphaltic base crude may be used for producing resins if it has a distillation range within approximately 300° F to 660° F. under an absolute pressure of 1 mm. mercury. The tar distillate, sulfur dioxide extract and the asphaltic distillate may be grouped generically as petroleum hydrocarbon liquids rich in compounds having a ring structure.

When the chlorinated distillate is condensed with an aromatic hydrocarbon, a polycyclic aromatic hydrocarbon, a naphthalene, or a hydrogenated polycyclic aromatic hydrocarbon in the presence of a condensing agent such as aluminum chloride, the condensed product consists of an oil and an oil-insoluble sludge. The latter becomes almost all soluble in oil (with the exception of aluminum hydroxid) on hydrolysis. Instead of hydrolyzing the whole inhomogeneous condensation product as above the oil fraction may be removed from the insoluble sludge, and each fraction separately hydrolyzed and further worked up according to our process. The product is a comparatively light colored resin which has a softening point of about 180° F. and is somewhat plastic and more difficult to break than the darker and more brittle resin obtained from the sludge. Ordinarily the plastic resin constitutes about ⅓ of the total resin formed but its yield may be somewhat increased by reducing the time of condensation.

Considering their origin the resins prepared by the condensation of chlorinated petroleum distillate, especially cracked tar distillate, with an aromatic, etc., hydrocarbon may be characterized as a co-resinified petroleum (cracked tar) distillate and aromatic, naphthenic, polycyclic aromatic or hydrogenated polycyclic aromatic hydrocarbon.

Referring now to the drawing, 1 is a chlorinating vessel provided with an agitator 2, chlorine line 3, and a line 4 for introducing the hydrocarbon material from a tank 5. Evolved gases pass through the scrubber 6 in which hydrochloric acid is removed by washing with water or other solvent. Chlorine is returned to the chlorine line 3. Numeral 7 designates a vessel provided with an agitator for carrying out the condensation reaction. Any vapors evolved during the reaction are condensed in condenser 8 and returned to vessel 7. 9 is the agitator for water or weak acid or alkali wash, 10 the still with a vapor line 11, a bottom draw-off line 12, and a cooler 13. The cooled resin is ground in mill 14 and transferred to the extractor 15 to which naphtha is admitted through line 15'. The material from extractor 15 is passed by means of a pump 16 through filter press 16' to the still 17 in which the naphtha is distilled overhead and condensed in condenser 18 to be returned to the naphtha tank 19. The final resin product is drawn off through line 20, cooled and stored.

The following examples will serve to illustrate our process:

1,000 pounds of distillate from a cracking coil tar of petroleum origin, boiling between 300° F. to 660° F. under an absolute pressure of 1 mm. mercury was chlorinated at 80° F., using a cooling system to prevent increase in temperature until the chlorine content became 9.7% by weight. The chlorinated distillate was pumped into a tank equipped with an agitator and sealed by a reflux condenser. 50 pounds of anhydrous aluminum chloride was then added and the mixture agitated for 12 hours at 80°–90° F. After the reaction was complete the reaction mixture was washed with water and the oil and sludge charged to a still. The temperature was brought up to 600° F. at atmospheric pressure, then cooled and vacuum applied. The distillation was continued until the temperature of the bottoms became the equivalent of 660° F. under 1 mm. of mercury. In this way 293 pounds of high boiling condensed product was obtained. The bottoms was extracted with 300 gallons 86° A. P. I naphtha, obtaining 221 pounds of resin in solution. After removing the solvent by atmospheric distillation there was obtained 221 pounds of resin having a softening point of 213° F.

As another example 1,000 pounds of the same distillate as used in the foregoing example were chlorinated to the same degree. The chlorinated distillate was treated in the same type of tank as in the foregoing example with 50 pounds of anhydrous aluminum chloride with the difference that in this case 250 pounds of benzol were mixed with the chlorinated distillate. The condensation was carried out at the same temperature for the same time and the reaction product treated in the same way. The yields, however, in this case were 440 pounds of condensed product which when separated into 86° A. P. I. naphtha soluble and insoluble, produced 368 pounds of hydrocarbon soluble resin of softening point 194° F.

This invention is not to be limited by any theory or the particular details given for purpose of illustration, but only by the following claims in which it is our intention to claim all novelty inherent in the process.

We claim:

1. Process for producing a resin from a hydrocarbon distillate of petroleum origin rich in compounds having a ring structure and boiling within the approximate limits of 300° to 660° F. under an absolute pressure of 1 mm. mercury, which comprises chlorinating the distillate to obtain a chlorinated product, adding a metal halide condensing agent to the chlorinated product and agitating the mixture at a temperature not substantially exceeding 210° F., treating with a hydrolyzing agent and distilling the oily layer obtained by hydrolysis and containing oily constituents and resin to remove the oily constituents therefrom, treating the distillation residue with a selective solvent for resin, and separating the insoluble products from the solution containing the resin.

2. Process according to claim 1 in which solvent containing the resin is submitted to distillation to remove solvent from the resin.

3. Process according to claim 1 in which a ring type hydrocarbon selected from the class consisting of aromatic, polycyclic aromatic, naphthenic and hydrogenated polycyclic aromatic hydrocarbons is added to the chlorinated product simultaneously with the anhydrous condensing agent.

4. Process according to claim 1 in which benzol is added to the chlorinated product simultaneously with the condensing agent.

5. Process according to claim 1 in which the mixture agitated with the condensing agent is separated into an oily layer and an oil-insoluble sludge, and separately treating each layer with a hydrolyzing agent and further processing the same according to claim 1.

6. Process according to claim 1 in which the resin solution is acid treated, separated from the resulting acid sludge, and neutralized.

7. Process according to claim 1 in which the hydrocarbon distillate is obtained by subjecting a cracked tar of petroleum origin to distillation.

8. Process according to claim 1 in which the hydrocarbon distillate is a sulfur dioxid extract obtained by extracting a petroleum distillate with liquid sulfur dioxid.

9. Process according to claim 1 in which the chlorination is continued until about 10 to 15% of chlorine is absorbed.

10. An unsaponifiable resin obtained from cracked tar of petroleum origin by treating with chlorine the tar fraction boiling within the approximate limits of 300° to 660° F. under an absolute pressure of 1 mm. mercury, condensing with a metal halide condensing agent, distilling off the oily constituents after treatment with a hydrolyzing agent, dissolving the resin from the distillation residue with a selective resin solvent and distilling off the solvent from the dissolved resin.

11. An unsaponifiable resin obtained from a hydrocarbon distillate rich in compounds having a ring structure and boiling within the approximate limits of 300° to 660° F. under an absolute pressure of 1 mm. mercury, by chlorination, condensing with a metal halide condensing agent, distilling off the oily constituents after treatment with a hydrolyzing agent, dissolving the resin from the distillation residue with a selective resin solvent and distilling off the solvent from the dissolved resin.

12. A resin produced by chlorinating a distillate boiling above about 300° F. at 1 mm. mercury absolute pressure, from a cracked petroleum tar, condensing the chlorinated distillate by contact with a metal halide condensing agent, hydrolyzing the condensed product and separating said resin therefrom, said resin being an unsaponifiable solid, clear, light yellow to reddish brown color, softening point above 80° F., soluble in petroleum naphtha, linseed oil and benzol; and insoluble in water, lower alcohols and acetone.

13. Product according to claim 12, produced by adding an aromatic hydrocarbon during the treatment with a metal halide.

14. Product according to claim 12 produced by adding a ring type hydrocarbon selected from the class consisting of aromatic, polycyclic aromatic, naphthenic, and hydrogenated polycyclic aromatic hydrocarbons during the treatment with a metal halide.

15. Process for producing a resin which comprises chlorinating a distillate, boiling above about 300° F. at 1 mm. mercury absolute pressure, from a cracked petroleum tar, condensing the chlorinated distillate by contact with a metal halide condensing agent, hydrolyzing the reaction product and extracting a resin therefrom with a solvent.

16. Process according to claim 15 in which said cracked petroleum tar distillate boils between about 300 and 660° F. at 1 mm. mercury absolute pressure.

17. Process according to claim 15 in which the said contact with a metal halide condensing agent is conducted at a reaction temperature below about 210° F.

18. Process according to claim 15 in which the said contact with a metal halide condensing agent is conducted at a reaction temperature below about 150° F.

19. Process for producing a resin which comprises chlorinating a distillate, boiling within the approximate limits of 300 to 660° F. under an absolute pressure of 1 mm. mercury, from a cracked petroleum tar, agitating the chlorinated distillate in contact with a metal halide condensing agent at a reaction temperature below about 210° F., hydrolyzing the resulting reaction product, heating the hydrolyzed product to remove oily constituents therefrom as distillate and treating the distillation residue, substantially free of oily materials, with a selective solvent for resin and separating the insoluble products from the solution containing the resin.

STEWART C. FULTON.
JOHN KUNC.